Jan. 14, 1964　　　J. L. WALLACE　　　3,117,373
DRUM OPENING TOOL
Filed Oct. 15, 1962
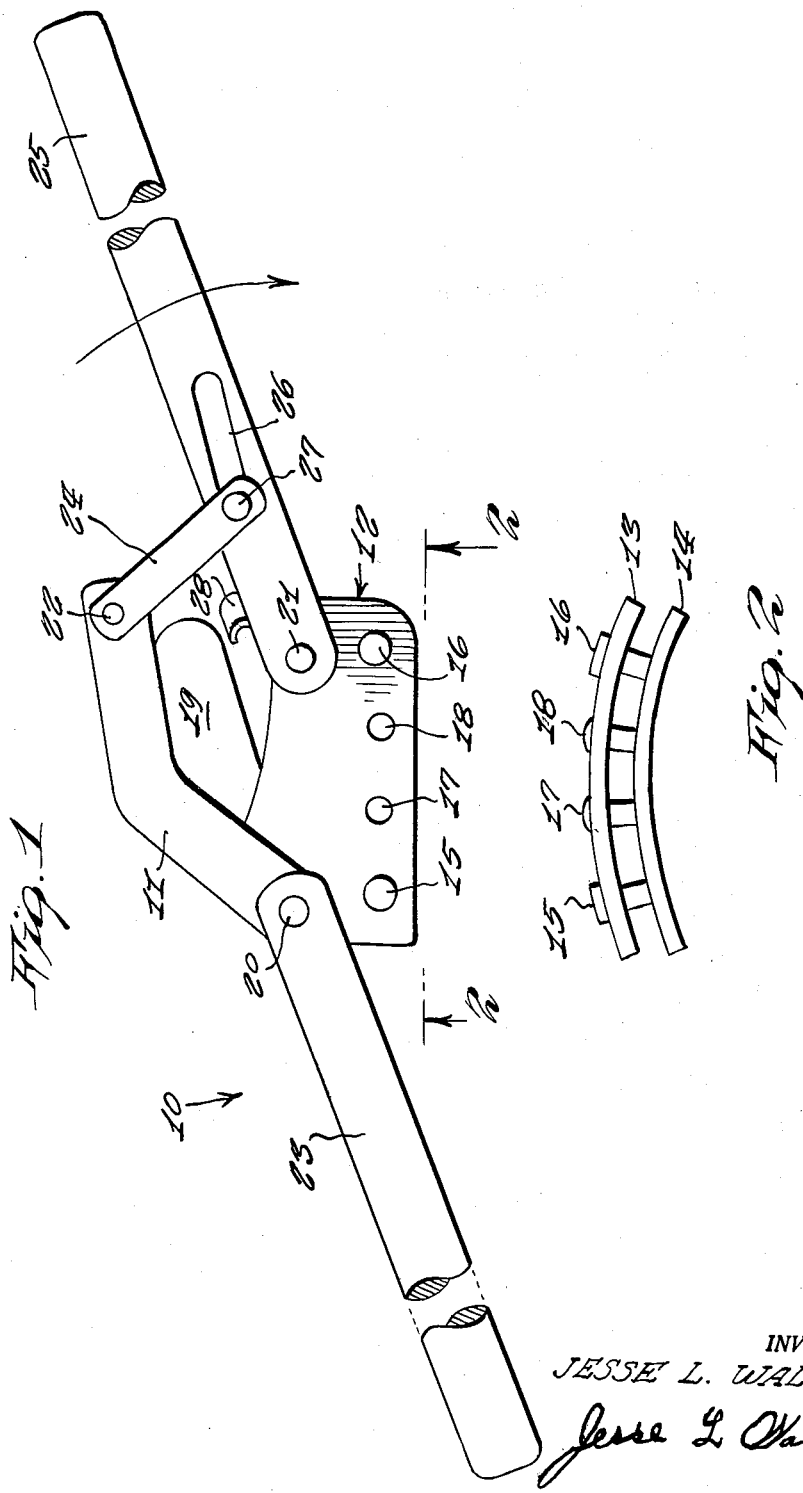
INVENTOR.
JESSE L. WALLACE
Jesse L. Wallace

3,117,373
DRUM OPENING TOOL
Jesse L. Wallace, 2935 Moore Ave., Canton, Ohio
Filed Oct. 15, 1962, Ser. No. 230,535
4 Claims. (Cl. 30—3)

This invention relates to tools for opening the ends of steel drums of the nature that are used as containers for oil tar and the like and which can be used as containers for other materials after their content has been removed. It is generally well known to those skilled in the art that it requires considerable manual effort to cut off the end of such steel drums, this having been done heretofore mostly by means of a hammer and chisel, which is very laborious and which leaves a very rough edge which can be dangerous and can injure a person's hands.

Accordingly, it is one object of the present invention to provide a drum shear which will easily cut off the end of a steel drum without requiring prodigious labor.

It is another object of the present invention to provide a drum shear which will cut off the end of a steel drum and leave a relatively smooth edge thereupon which will not in any way be dangerous to cause an injury to a person.

Still another object of the present invention is to provide a drum shear which will cut off the end of a steel drum in a relatively short space of time.

Other objects of the invention are to provide a drum shear bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevational view of a drum shear incorporating the present invention; and FIGURE 2 is a fragmentary bottom elevational view thereof.

Referring now to the drawing in detail, the numeral 10 represents a drum shear according to the present invention wherein there are a pair of shear elements 11 and 12. The shear element 11 forms the upper member of the shear and is of generally angled configuration as shown in FIGURE 1 of the drawing, the lower shear element 12 is comprised of a pair of plates 13 and 14 having a pair of cap screws 15 and 16 extending therebetween as well as a pair of guide pins 17 and 18. It is to be noted that the lower shear element is of arcuate configuration as shown in FIGURE 2 of the drawing, this arcuate configuration being for the purpose of adaptability to the arcuate rim of the steel drum. A blade element 19 is located in offset position relative to the upper shear element 11 and is likewise of arcuate configuration in order to follow the contour of a drum rim. The blade is offset relative to the upper shear element so that the bead of the drum can pass therebetween the upper shear element and the blade. The lower shear element is provided with openings at each opposite longitudinal end for receiving pins 20 and 21 therethrough. The upper shear element 11 is likewise provided with openings at its opposite longitudinal ends, one of which receives pin 20 therethrough and the other a pin 22. The pin 20 is welded to the lower shear element and is provided with screw threads on its end for threaded engagement into one end of a handle 23. The pin 22 may likewise be threaded at its one end and is attachable to one end of a link 24. The pin 21 is welded to the lower shear element 12 and is likewise threaded at its opposite end to receive one end of a handle 25. This handle has an elongated longitudinal slot 26 therein and the link 24 has a pin or bolt 27 at its opposite longitudinal end which extends into the slot 26 as shown in FIGURE 1 of the drawing. All the parts are made of relatively strong heavy gauge steel for the purpose of providing rugged strength in operation. A hook element 28 is provided adjacent one end of the handle and is for the purpose of hooking over the top of the drum being cut and serves to aid this end from dropping down during the start of the cutting operation. This hook element is integrally affixed and forms a part of the lower shear element.

In operative use, the device is applied to the end of a steel drum adjacent the rim thereof in a manner so that the bead of the drum will extend between the upper shear element and the blade edge. The purpose of the slot 26 in the handle 25 is to allow the tool to open up further when the handle is pushed into a straight up position thus making it easier to put on or take off the rim of the steel drum and still allow plenty of leverage for easy operation. The cutting operation occurs when the handle 25 is pivoted downwardly on a down stroke.

It is to be understood that this drum shear may be made in any size desired in order to accommodate steel drums of various sizes.

Thus there has been shown a drum shear which will readily cut off the end of a steel drum with a minimum amount of effort, a minimum amount of time and leave a very smooth edge which will prevent endangering a person's hand which comes in contact with the sheared off edge of the drum.

While various changes may be made in the detail construction it shall be understood that such changes shall be within the spirit and scope of the present invention as defined by the appended claims.

What I claim as new and desire to protect by Letters Patent of the United States is:

1. In a drum shear the combination of a pair of shear elements, one of said elements comprising an upper shear element and the other of said elements comprising a lower shear element, a blade element and means for applying pressure to said shear elements to cause shearing movement therebetween the said means for applying pressure comprising a pair of handles, one of said handles being attached at its one end to one end of said upper and lower shear element and the other of said handles being attached at its one end to the opposite end of said lower shear element, a link extending between the opposite end of said upper shear element and said other handle, said other handle having a longitudinally extending slot, said link having a bolt extending through its opposite longitudinal end, said bolt being engaged in said slot of said handle to provide additional relative movement.

2. In a drum shear the combination as set forth in claim 1, wherein said blade is of arcuate configuration, said blade being in offset position relative to said upper shear element so to permit the bead of a drum being sheared to pass therebetween said blade edge and said upper shear element.

3. In a drum shear the combination as set forth in claim 2 wherein said lower shear element is comprised of a pair of plates in spaced apart parallel relationship, said lower shear element being of arcuate configuration and said lower shear element having a hook element adjacent its upper edge for hooking over the rim of a drum being sheared to maintain said element from dropping downward during start of the cutting operation.

4. In a drum shear the combination of a pair of shear elements, one of said elements comprising an upper shear element and the other of said elements comprising a lower shear element, a blade element and means for applying pressure to said shear elements to cause shearing movement therebetween, the said means for applying pressure comprising a pair of handles, one of said handles being attached at its one end to one end of said upper and lower shear elements and the other of said handles being attached at its one end to the opposite end of said lower shear element, a link extending between the opposite end of said upper shear element and said other handle, said link having a bolt extending through its opposite longitudinal end, said bolt being engaged in said other handle, said blade being of arcuate configuration, said blade being in offset position relative to said upper shear element so as to permit the bead of a drum being sheared to pass between said blade edge and said upper shear element, said lower shear element being of arcuate configuration and having a hook element adjacent its upper edge for hooking over the rim of a drum being sheared to maintain said lower shear element from dropping downward during start of the cutting operation.

References Cited in the file of this patent

UNITED STATES PATENTS

| | | |
|---|---|---|
| 1,985,862 | Kronquest | Dec. 25, 1934 |
| 2,252,406 | O'Brien | Aug. 12, 1941 |
| 2,317,541 | Leck | Apr. 27, 1943 |
| 2,751,678 | Sauer | June 26, 1956 |
| 2,898,675 | Sheehy | Aug. 11, 1959 |
| 2,964,843 | Oppegard | Dec. 20, 1960 |